US012418952B2

(12) United States Patent
Wu (10) Patent No.: US 12,418,952 B2
(45) Date of Patent: Sep. 16, 2025

(54) SECONDARY CELL GROUP FAILURE IN DUAL CONNECTIVITY (71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 579 days.

(21) Appl. No.: 17/430,133

(22) PCT Filed: Feb. 10, 2020

(86) PCT No.: PCT/US2020/017469
§ 371 (c)(1),
(2) Date: Aug. 11, 2021

(87) PCT Pub. No.: WO2020/167644
PCT Pub. Date: Aug. 20, 2020

(65) Prior Publication Data
US 2022/0104301 A1 Mar. 31, 2022

Related U.S. Application Data (60) Provisional application No. 62/804,202, filed on Feb. 11, 2019.

(51) Int. Cl.
H04W 76/19 (2018.01)
H04W 24/10 (2009.01)
(Continued)

(52) U.S. Cl.
CPC ........... *H04W 76/19* (2018.02); *H04W 24/10* (2013.01); *H04W 76/16* (2018.02); *H04W 76/20* (2018.02)

(58) Field of Classification Search
CPC ..... H04W 24/10; H04W 76/20; H04W 88/06; H04W 76/18; H04W 76/15; H04W 76/19;
(Continued)

(56) References Cited

U.S. PATENT DOCUMENTS 9,232,418 B2 * 1/2016 Lindoff ................. H04W 76/16
9,451,609 B2 9/2016 Fukuta et al.
(Continued)

FOREIGN PATENT DOCUMENTS

CN 103597899 A 2/2014
CN 105960772 A 9/2016
(Continued)

OTHER PUBLICATIONS

Huawei, HiSilicon ,"Change Request on 38.331 for SCG failure in NR-DC", 3GPP TSG RAN WG2 Meeting #104, R2-1817368, Nov. 2018, 5 Pages (Year: 2018).*
(Continued)

*Primary Examiner* — Brian T O Connor
(74) *Attorney, Agent, or Firm* — MARSHALL, GERSTEIN & BORUN LLP (57) ABSTRACT A user device operating in dual-mode connectivity with a master node and a secondary node detects a failure of a secondary cell group associated with the secondary node (1004). In response, the user device suspends an secondary cell group transmission (1006). The user device generates a message related to a status of the SCG for transmission to the MN (1008) and transmitting the message to the MN when the SCG transmission is suspended (1010).

19 Claims, 9 Drawing Sheets (51) Int. Cl.
*H04W 76/16* (2018.01)
*H04W 76/20* (2018.01)

(58) Field of Classification Search
CPC ..... H04W 76/27; H04W 80/02; H04W 84/18; H04W 76/16; H04W 24/04
See application file for complete search history.

(56) References Cited

U.S. PATENT DOCUMENTS

| | | | |
|---|---|---|---|
| 9,504,052 B2 * | 11/2016 | Wu | H04W 72/542 |
| 9,820,332 B2 * | 11/2017 | Lee | H04W 76/38 |
| 9,907,110 B2 | 2/2018 | Susitaival et al. | |
| 10,440,615 B2 * | 10/2019 | Wu | H04W 36/0027 |
| 11,165,632 B2 * | 11/2021 | Lee | H04W 74/0833 |
| 11,206,707 B2 * | 12/2021 | Deogun | H04W 76/27 |
| 11,219,079 B2 * | 1/2022 | Lee | H04L 1/1874 |
| 11,582,625 B2 * | 2/2023 | Wu | H04L 5/0098 |
| 12,069,759 B2 * | 8/2024 | Jung | H04L 1/1812 |
| 2015/0223282 A1 | 8/2015 | Vajapeyam et al. | |
| 2015/0358957 A1 * | 12/2015 | Kim | H04W 72/21 455/450 |
| 2016/0044743 A1 * | 2/2016 | Xu | H04W 76/34 370/329 |
| 2018/0302834 A1 | 10/2018 | Zhang et al. | |
| 2018/0368029 A1 * | 12/2018 | Wu | H04W 36/0069 |
| 2019/0090144 A1 * | 3/2019 | Wu | H04L 41/0816 |
| 2020/0305213 A1 | 9/2020 | Teyeb et al. | |
| 2021/0153281 A1 * | 5/2021 | Deogun | H04W 24/10 |
| 2024/0292291 A1 * | 8/2024 | Orsino | H04W 76/19 |

FOREIGN PATENT DOCUMENTS

| | | |
|---|---|---|
| CN | 106576381 A | 4/2017 |
| CN | 107925905 A | 4/2018 |
| CN | 108924866 A | 11/2018 |
| CN | 109076383 A | 12/2018 |
| EP | 2 874 460 A1 | 5/2015 |
| EP | 3 051 916 A1 | 8/2016 |
| WO | WO-2012/139798 A1 | 10/2012 |
| WO | WO-2016/195735 A1 | 12/2016 |
| WO | WO-2017/014686 A1 | 1/2017 |
| WO | WO-2018/182254 A1 | 10/2018 |
| WO | WO-2018/203710 A1 | 11/2018 |
| WO | WO-2020/162704 A1 | 8/2020 |

OTHER PUBLICATIONS

International Search Report and Written Opinion for Application No. PCT/US2020/017469, dated May 20, 2020.
First Examination Report for India Application No. 202147038643, dated Mar. 8, 2022.
Office Action for Chinese Patent Application No. 202080026772.6, dated Jun. 30, 2023.
Office Action for European Application No. 20711368.9, dated Jun. 19, 2023.
"5G; NR; Radio Resource Control (RRC); Protocol specification (3GPP TS 38.331 version 15.4.0 Release 15)," ETSI TS 138 331 V15.4.0 (Aug. 2019).
"LTE; Evolved Universal Terrestrial Radio Access (E-UTRA); Radio Resource Control (RRC); Protocol specification (3GPP TS 36.331 version 15.3.0 Release 15)," Etsi TS 136 331 V15.3.0 (Oct. 2018).
"Universal Mobile Telecommunications System (UMTS); LTE; 5G; NR; Multi-connectivity; Overall description; Stage-2 (3GPP TS 37.340 version 15.4.0 Release 15)," ETSI TS 137 340 V15.4.0 (Apr. 2019).
Second Office Action for Chinese Patent Application No. 202080026772.6, dated Jan. 25, 2024.

* cited by examiner

SECONDARY CELL GROUP FAILURE IN DUAL CONNECTIVITY

FIELD OF THE DISCLOSURE

This disclosure relates generally to wireless communications and, more particularly, to methods and apparatus to handle secondary cell group (SCG) failures in dual connectivity (DC).

BACKGROUND

A user device (or user equipment, commonly denoted by acronym "UE") in some cases can operate in DC with a master node (MN) and a secondary node (SN). The MN and the SN are base stations that can operate according to the same radio access technology (RAT) or, in a multi-radio DC (MR-DC) configuration, different RATs. Two configurations in which the MN supports Evolved Universal Terrestrial Radio Access (EUTRA) and the SN supports 5G new radio (NR) are referred to as EN-DC and NGEN-DC, and a configuration in which the MN supports NR and the SN supports EUTRA is referred to as NE-DC. Yet another configuration, NN-DC, has both the MN and SN supporting NR. DC is described in, for example, the 3rd Generation Partnership Project (3GPP) standard TS 37.340 v. 15.4.0.

The MN can provide a control plane connection and a user plane connection to a core network (CN), whereas the SN generally provides a user plane connection. The cells associated with the MN define a master cell group (MCG), and the cells associated with the SN define the SCG.

The UE and the base stations MN and SN can use signaling radio bearers (SRBs) to exchange radio link control (RRC) messages, as well as non-access stratum (NAS) messages. There are several types of SRBs that UEs can use when operating in DC. SRB1 and SRB2 resources allow the UE and the MN to exchange RRC messages related to the MN, and to embed RRC messages related to the SN, and can be referred to as MCG SRBs. SRB3 resources allow the UE and the SN to exchange RRC messages related to the SN, and can be referred to as SCG SRBs. Split SRBs allow the UE to exchange RRC messages directly with the MN and the SN. Further, the UE and the base stations MN and SN use data radio bearers (DRBs) to transport data on a user plane. DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of both the MN and the SN can be referred to as split DRBs.

There are scenarios in which the UE can detect SCG failure, which can be a radio link failure (RLF), a failure of SCG reconfiguration with synchronization, an SCG configuration failure for RRC messaging on SRB3, etc. For example, the UE in EN-DC with a master evolved Node B (MeNB) and a secondary 5G node B (SgNB) can detect an SCG failure associated with the SgNB (NR SCG failure). Upon detecting an NR SCG failure, the UE suspends NR SCG transmission for all SRBs and DRBs configured to use the resources provided by the SgNB as, for example, required by the 3GPP standard TS 38.331 v15.4.0.

However, because another standard, 3GPP TS 36.331 v15.3.0, prevents the UE from reporting the NR SCG failure to the MeNB because the NR SCG transmission is suspended, the MeNB is unaware of the NR SCG failure. As a result, the MeNB cannot take remedial action such as informing the NR SCG failure to the SgNB or releasing the SgNB from the current DC configuration of the UE. This in turn causes the SgNB to transmit data to the UE, which the UE cannot receive due to the SCG failure. For similar reasons, when MN is an gNB and the SN is an eNB, the UE suspends EUTRA SCG transmissions and cannot report the EUTRA SCG failure to the MN. Further, when the UE suspends SCG transmission, the UE in some scenarios cannot deliver a measurement report to the MN.

SUMMARY

Generally speaking, the techniques of this disclosure allow UEs and base stations to handle SCG failures in DC for single RAT and dual RAT configurations. An example UE of this disclosure detects SCG failure and suspends SCG transmission. The UE then reports SCG failure to the MN even though the SCG has been suspended. In another case, the UE generates a measurement report and transmits the measurement report to the MN when the SCG has been suspended. Thus, in a sense, the UE overrides the SCG suspension to transmit an indication of SCG failure or a measurement to the MN.

In an example scenario, a UE operating in EN-DC (or NGEN-DC) generates a measurement report in in accordance with the measurement configuration from the SgNB. The UE then initiates transmission of the measurement report to the SgNB using the corresponding SCG SRB (e.g., SRB3) and detects NR SCG failure (e.g., based on the indication from lower layers). The UE accordingly suspends NR SCG transmission. The UE then transmits SCGFailureInformationNR (which is an RRC message that reports SCG failure for an NR connection to the SgNB) to the MeNB (or a Master next generation eNB in the case of the NGEN-DC) while the NR SCG transmission is suspended. To this end, the UE can use a EUTRA SRB1 to transmit the SCGFailureInformationNR and transmit the measurement report (if not yet transmitted to the SgNB before detecting the NR SCG failure) to the MeNB (or the Master next generation eNB in case of the NGEN-DC).

In another example scenario, the UE operating in NE-DC detects EUTRA SCG failure and accordingly suspends EUTRA SCG transmission. The UE then transmits the SCGFailureInformationEUTRA message to the MgNB using an NR SRB1 while the EUTRA SCG transmission is suspended.

In still other scenarios, the UE generates a measurement report and transmits the report to the MN when the NR SCG transmission is suspended in EN-DC and NGEN-DC configurations or when EUTRA SCG transmission is suspended in NE-DC configurations.

An example embodiment of these techniques is a method in a UE operating in DC connectivity with an MN and a SN. The method comprises detecting, by processing hardware, a failure of an SCG associated with the SN; suspending, by the processing hardware, an SCG transmission in response to detecting the failure of the SCG; generating, by the processing hardware, a message related to a status of the SCG for transmission to the MN; and transmitting, by the processing hardware, the message to the MN when the SCG transmission is suspended.

Another example embodiment of these techniques is a UE comprising processing hardware configured to implement the method above.

BRIEF DESCRIPTION OF THE DRAWINGS

FIGS. 2-5 are messaging diagrams of example scenarios in which a UE notifies the MN of a SCG failure when the SCG transmission is suspended, in particular:

FIGS. 5-8 are messaging diagrams of example scenarios in which a UE transmits a measurement report to the MN when the SCG transmission is suspended, in particular:

DETAILED DESCRIPTION OF THE DRAWINGS

Figure 1:
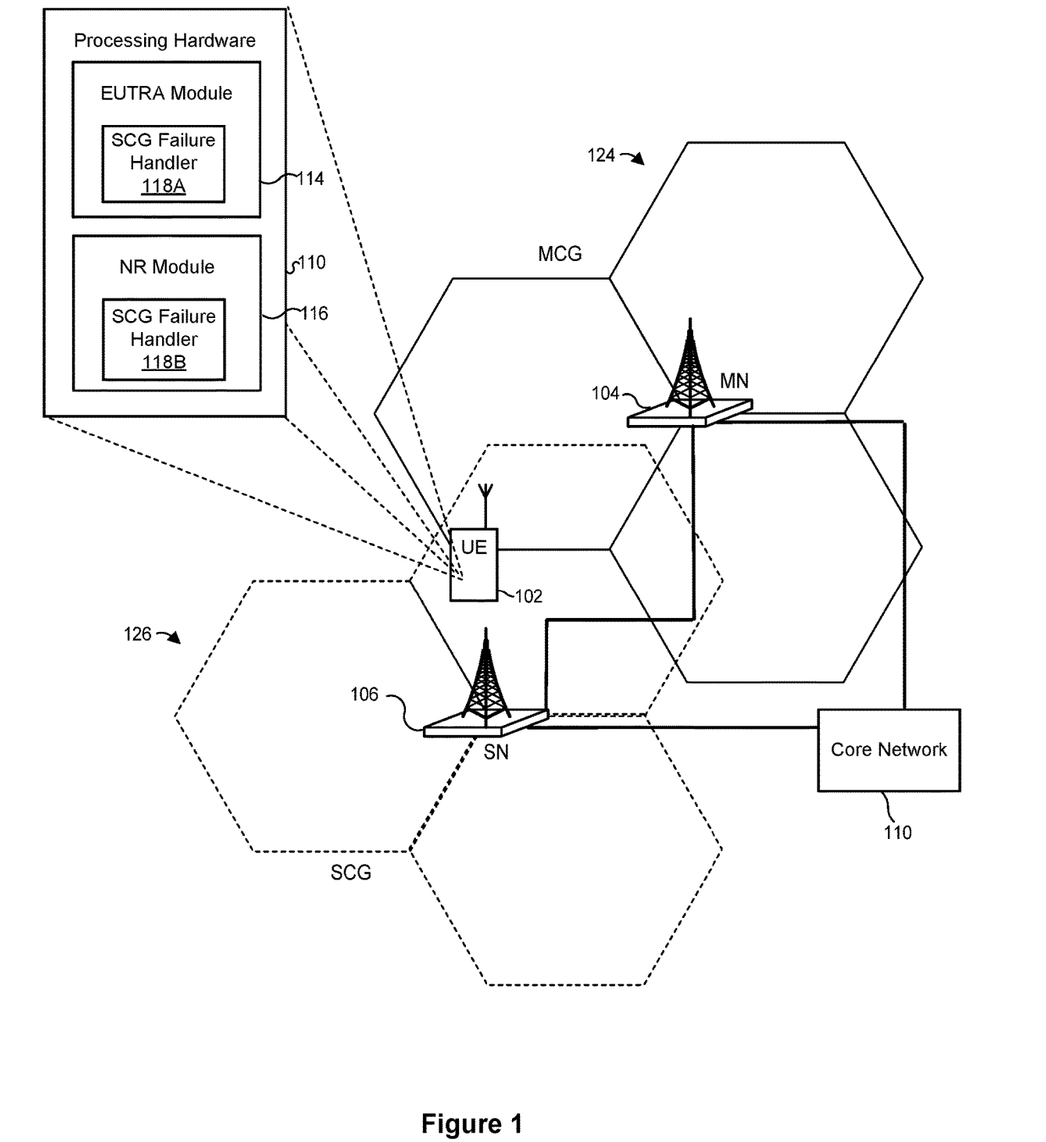
FIG. 1 is a block diagram of an example wireless communication network in which a UE handles SCG failures in dual connectivity in accordance with disclosure.

FIG. 1 depicts an example wireless communication network 100 in which an example EU 102 operates in DC with a MN 104 and a SN 106. To enable the communication network 100 to properly handle SCG failures, the UE 102 (which can be any suitable device capable of wireless communications, as discussed below) implements the techniques below to report SCG failures and measurement reports to the MN even when the SCG has been suspended.

More particularly, the UE 102 is equipped with processing hardware 110 that can include one or more general-purpose processors such as central processing units (CPUs) and non-transitory computer-readable memory storing machine-readable instructions executable on the one or more general-purpose processors, and/or special-purpose processing units. The processing hardware 110 in an example implementation includes a EUTRA module 114 and an NR module 116, which in turn include an SCG failure handler 118A and an SCG failure handler 118B, respectively. In general, the functionality discussed below with reference to the SCG failure handler 118A or 118B can be implemented in the EUTRA module 114, the NR module 116, or as a separate module. In the discussion of SCG failure handling below, references to the SCG failure handler 118A and the EUTRA module 114, as well as the SCG failure handler 118B and the NR module 116, can be used interchangeably.

In operation, the SCG failure handler 118A or 118B can detect an SCG failure and transmit a notification to the MN 104, or cause the EUTRA module 114 or the NR module 116 generate and transmit this notification. The SCG failure handler 118A or 118B additionally or alternatively causes the UE 102 to transmit a measurement report to the MN 106, under certain circumstances related to SCG failure.

The UE 102 communicates with the MN 104 that covers an MCG 124 made up of one or more cells, and the SN 106 that covers an SCG 126 made up of one or more cells. In different configurations of the network 100, the MN 104 can be implemented as a master eNB (MeNB) or a master gNB (MgNB) node, the SN 106 104 can be implemented as a secondary eNB (SeNB) or a secondary gNB (SgNB) node, and the UE 102 communicates with the MN 104 and SN 106 via the same RAT such as EUTRA or NR, or different RATs such as EUTRA and NR. In some cases, the MeNB or SeNB is implemented as an ng-eNB rather than an eNB. The MN 104 and the SN 106 can be coupled to a core network 110. For example, the core network 110 can be a 5G core network (5GC) or an evolved packet core (EPC). Some of these example configurations are discussed in more detail below.

Although handling of SCG is are discussed in this disclosure with reference to these RATs and core network technologies, more generally these techniques can be used with any suitable systems in which SCG failures triggers suspension of certain transmissions. Further, these techniques can be used when the UE 102 operates in dual connectivity via a single RAT or different RATs.

Next, several scenarios corresponding to different DC configurations and/or different UE implementations are discussed with reference to FIGS. 2-9.

Figure 2:
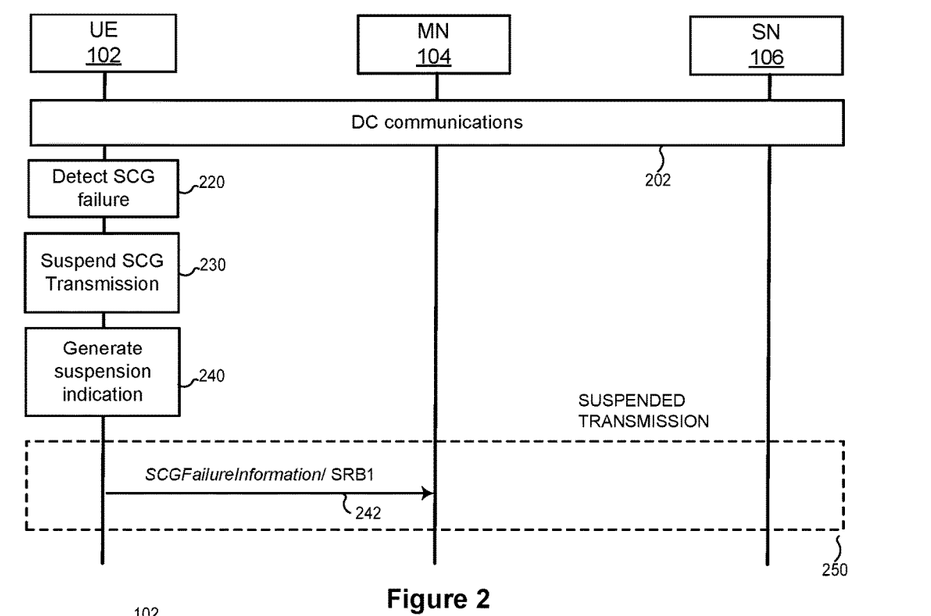
FIG. 2 illustrates an example scenario in which a UE transmits to an MN an indication of SCG failure for an NR or EUTRA connection.

Referring first to FIG. 2, the UE 102 at the beginning of the scenario is communicating 202 in DC with the MN 104 and the SN 106. The UE 102 is configured with an SRB1 (e.g., a EUTRA SRB1 or an NR SRB1) to exchange EUTRA RRC messages (when operating in EN-DC or NGEN-DC, for example) or NR RRC messages (when operating in NE-DC) with the MN 104. The UE 102 is also configured with at least one DRB that utilizes resources of the SCG 124 provided by the SN 106. For example, the UE 102 can be configured with an SRB3 (e.g., NR SRB3 or EUTRA SRB3) to exchange NR RRC messages with the SN 106.

The UE 102 detects 220 an SCG failure associated with the SN 106. For example, referring back to FIG. 1, the SCG failure handler 118A or 118B can detect RLF, failure of SCG reconfiguration with synchronization, SCG configuration failure for RRC message on SRB3 and SCG integrity check failure, etc.

In response to detecting the SCG failure, the UE 102 (e.g., the SCG failure handler 118A, 118B or another suitable component) suspends 230 SCG transmissions. In some implementations, the UE 102 suspends the SCG transmissions for the SRB(s) and the one or more DRBs configured to use SCG radio resources of the SN 106. When an SRB/DRB is configured to use the SCG radio resources before detecting the SCG failure, the UE 102 has nothing to suspend for the SRB/DRB.

In one example scenario, the MN 104 configures the UE 102 with an SRB1 (e.g., an EUTRA SRB1 or an NR SRB1) that only uses MCG radio resources to transmit RRC messages and receive RRC messages. When the SN 106 configures the UE 102 with an SRB3 (e.g., an NR SRB3 or EUTRA SRB3) that only uses the SCG radio resources to transmit RRC messages and receive RRC messages, the UE 102 suspends the SCG transmission for the SRB3 in response to the SCG failure. More particularly, the SCG failure handler 118A or 118B prevents the UE 102 from transmitting to the SN 106 an RRC message corresponding to the SRB3 using the SCG radio resources during the SCG failure.

In another example scenario, the MN 104 or the SN 106 configures the UE 102 with a DRB that uses the SCG radio resources to transmit (or receive) Packet Data Convergence Protocol (PDCP) Protocol Data Units (PDUs). The UE 102 suspends the NR SCG transmission for the DRB in response to the SCG failure. More particularly, the SCG failure handler 118A or 118B in this case prevents the UE 102 from transmitting to (or receiving from) the SN 106 a PDCP PDU corresponding to the DRB using the SCG radio resources during the SCG failure. In this case, the DRB can be a split bearer or an SCG bearer.

The UE 102 generates 240 an indication of the SCG failure (e.g., an SCGFailureInformationNR or SCGFailureInformationEUTRA message) and transmits 242 the indication even though the UE 102 previously suspended the SCG transmissions (event 230), and the SCG transmissions remain in the suspended state 250. The UE 102 can transmit this indication on the SRB1, for example. In some implementations, the UE 102 transmits the SCGFailureInformationNR or SCGFailureInformationEUTRA message in an RRC message format of the MN. The MN 104 receives the SCGFailureInformationNR or SCGFailureInformationEUTRA message and becomes aware of the SCG failure. The MN 104 then can take remedial action.

In some implementations, the UE 102 may include a first SCG failure type of the SCG failure in the SCGFailureInformationNR or SCGFailureInformationEUTRA message. When the SCG failure is RLF, the first SCG failure type indicates the RLF. When the SCG failure is failure of SCG reconfiguration with synchronization, the first SCG failure type indicates the failure of SCG reconfiguration with synchronization. When the SCG failure is SCG configuration failure for RRC message on SRB3, the first SCG failure type indicates the SCG configuration failure for RRC message on SRB3. When the SCG failure is SCG integrity check failure, the first SCG failure type indicates the SCG integrity check failure.

In some cases, the UE 102 cannot handle uplink transmission timing difference between a primary cell (PCell) of the MCG and a primary secondary cell (PSCell) of the SCG (e.g., the timing difference exceeds a maximum uplink transmission timing difference). The UE 102 can determine that exceeding maximum uplink transmission timing difference is the SCG failure. In the SCGFailureInformationNR message, the UE sets the first SCG failure type to indicate one of the RLF, failure of SCG reconfiguration with synchronization, SCG configuration failure for RRC message on SRB3, SCG integrity check failure.

In some implementations, in addition to including the first SCG failure type in the SCGFailureInformationNR message, the UE can further include a second SCG failure type in the SCGFailureInformationNR message to indicate that the maximum uplink transmission timing difference was exceeded. An indication that the maximum uplink transmission timing difference was exceeded may be a new SCG failure type compared to legacy SCG failure types such as the RLF, failure of SCG reconfiguration with synchronization, SCG configuration failure for RRC message on SRB3 and SCG integrity check failure. The MN 104 in some implementations may not recognize the new SCG failure type and ignore a SCGFailureInformationNR message, which includes the new SCG failure type but does not include a legacy SCG failure type. To prevent the MN 104 from ignoring this information, the UE 102 can include the first SCG failure type and the second SCG failure type in the SCGFailureInformationNR message. The MN 104 that does not recognize the second SCG failure type still can recognize and process the first SCG failure type, and thus the MN 104 in this case does not ignore the SCGFailureInformationNR message including the first SCG failure type and the second SCG failure type.

The MN 104 in some cases can perform a procedure for recovering from SCG failure (not illustrated in FIG. 2 to avoid clutter). To this end, the MN 104 can transmit to the UE 102 an EUTRA RRC message (e.g., a EUTRA RRC Connection Reconfiguration message) or NR RRC message (e.g., an NR RRC Reconfiguration message) on the SRB1, depending on the DC mode. The EUTRA RRC message may include a NR RRC message (e.g., a NR RRC Reconfiguration message), which in turn may include NR configurations. The NR RRC message may include a EUTRA RRC message (e.g., a EUTRA RRC Connection Reconfiguration message), which in turn may include EUTRA configurations. The UE 102 resumes the NR or EUTRA SCG transmission in accordance with the NR or EUTRA configuration included in the EUTRA or NR RRC message with the SN 106 or another SN (not shown in FIG. 2). The UE 102 then can transmit a EUTRA RRC response message (e.g., a EUTRA RRC Connection Reconfiguration Complete message) on the SRB1 to the MN 104 to respond to the EUTRA RRC message, or an NR RRC response message (e.g., an NR RRC Reconfiguration Complete message) to respond to the NR RRC message. The UE 102 may include a NR RRC response message (e.g., a NR RRC Reconfiguration Complete message) in the EUTRA RRC response message to respond to the NR RRC message; or the UE 102 may include a EUTRA RRC response message (e.g., a EUTRA RRC Connection Reconfiguration Complete message) in the NR RRC response message. The MN 104 may forward the NR RRC response message or the EUTRA RRC response message to the SN 106 or the other SN.

In another scenario, the MN 104 transmits to the UE 102 a EUTRA RRC message (e.g., a EUTRA RRC Connection Reconfiguration message) on the SRB1 to the UE 102 to place the UE 102 is a non-DC configuration when/after receiving the SCGFailureInformationNR message, or the MN 104 transmits to the UE 102 an NR RRC message (e.g., an NR RRC Reconfiguration message) on the SRB1 to the UE 102 to place the UE 102 is a non-DC configuration when/after receiving the SCGFailureInformationEUTRA message. The UE 102 transmits a EUTRA RRC response message (e.g., a EUTRA RRC Connection Reconfiguration Complete message) or an NR RRC response message (e.g., a NR RRC Reconfiguration Complete message) on the SRB1 to the MN 104. The UE 102 releases the resources of the NR or EUTRA configuration associated with the SN 106 in response to the EUTRA RRC or the EUTRA RRC message, respectively. In some cases, the UE 102 receives the NR or EUTRA configuration from the SN 106 via the MN 104 or via the SRB3 before the SCG failure occurs.

Figure 3:
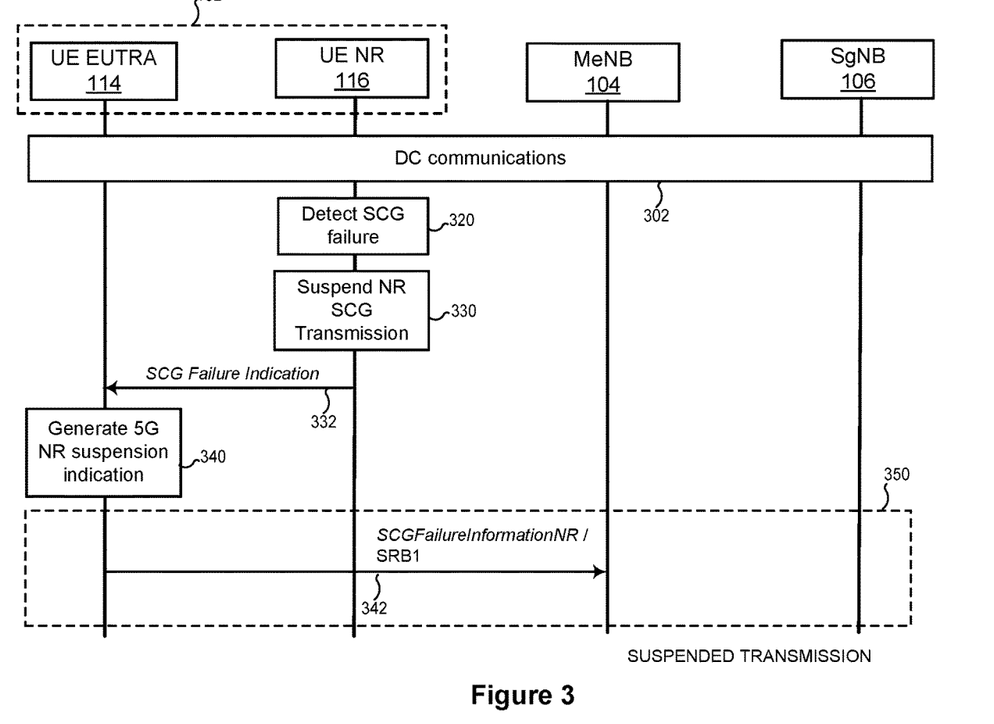
FIG. 3 illustrates an example scenario in which a EUTRA module operating in the UE transmits to an MeNB an indication of SCG failure for an NR connection.

Now referring to FIG. 3, the UE 102 initially is communicating 302 in DC with the MN 104 and the SN 106, similar to the communication 202 of FIG. 2. In this case, the UE may be operating EN-DC or NGEN-DC.

The UE NR module 116 (e.g., the SCG failure handler 118B) detects 320 SCG failure. In response, the UE NR module 116 suspends 330 NR SCG transmissions, similar to the event 230 discussed above. The NR module 116 also indicates 332 the SCG failure to the EUTRA module 114 via, for example, an internal SCG failure indication message.

The EUTRA module 114 generates 340 an indication of the SCG failure (e.g., an SCGFailureInformationNR message) and transmits 342 this indication to the MN 104 over the SRB1, even though the SCG transmissions are in the suspended state 350. In some scenarios, the EUTRA module 114 generates the SCGFailureInformationNR message in a EUTRA RRC message format. The MN 104 receives the SCGFailureInformationNR message, becomes aware of the SCG failure, and perform a procedure for recovering from SCG failure or take other remedial action.

In some implementations, the NR module 116 may send one or more measurement results to the EUTRA module 114 in response to detecting the SCG failure. The EUTRA module 114 may include the one or more measurement results in the SCGFailureInformationNR message. In one aspect, when the NR module 116 sends the one or more measurement results to the EUTRA module 114, the NR mode 116 removes the one or more measurement results (i.e., the one or more measurement results is not valid to be reported). In another aspect, when EUTRA module 114 includes the one or more measurement results in the SCGFailureInformationNR message, the EUTRA module 114 indicates the NR mode 116 to remove the one or more measurement results (i.e., the one or more measurement results is not valid to be reported).

Figure 4:
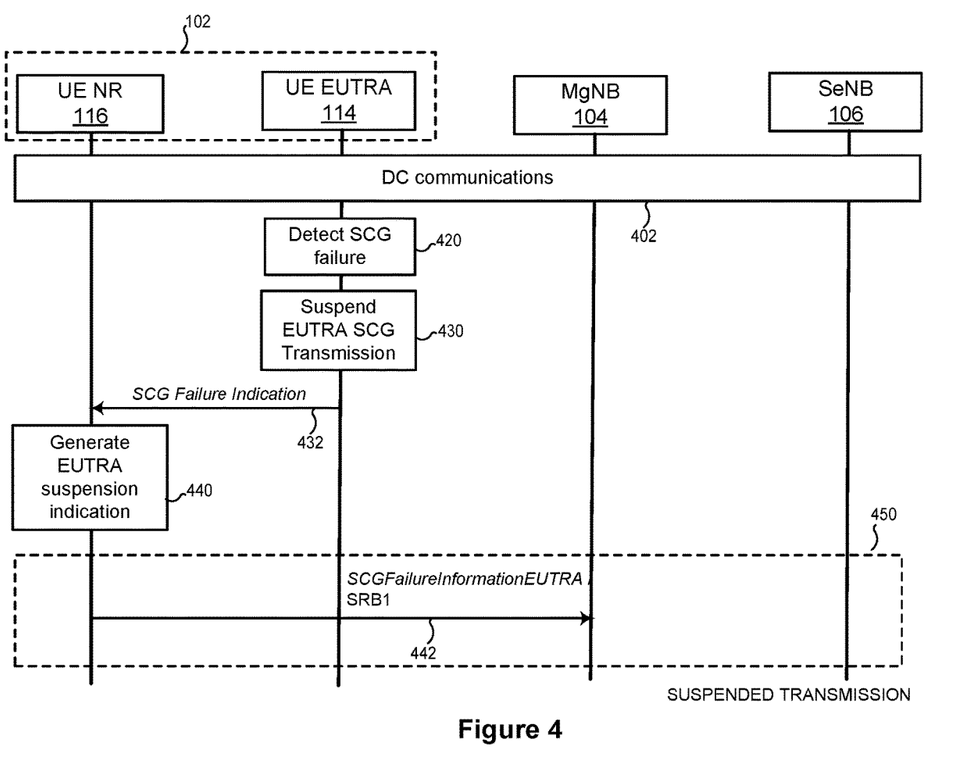
FIG. 4 illustrates an example scenario in which an NR module operating in the UE transmits to an MgNB an indication of SCG failure for a EUTRA connection.

Referring to FIG. 4, the UE 102 initially is communicating 402 in DC with the MgNB 104 and the SeNB 106. In this case, the UE may be operating NE-DC. In this scenario, the EUTRA module 114 (e.g., the SCG failure handler 118A) detects 420 SCG failure. In response, the EUTRA module 114 suspends 430 EUTRA SCG transmissions, similar to the event 230 discussed above. The EUTRA module 114 also indicates 432 the SCG failure to the UE NR module 116 via, for example, an internal SCG failure indication message.

The NR module 116 generates 440 an indication of the SCG failure (e.g., an SCGFailureInformationEUTRA message) and transmits 442 this indication to the MgNB 104 104 over the SRB1, even though the SCG transmissions are in the suspended state 440. This message can conform to the NR RRC message format. The MgNB 104 receives the SCGFailureInformationEUTRA message, becomes aware of the SCG failure, and performs a procedure for recovering from SCG failure or take other remedial action (similar to the remedial action discussed above with reference to FIG. 2, for example). As discussed above, the SCGFailureInformationEUTRA message can be defined to convey SCG failure for a EUTRA interface between a UE and an SN (e.g., the SeNB 106), or the message can conform to the format of the existing SCGFailureInformation message but include an additional information element, which can be defined specifically for indicating SCG failure.

In some implementations, the EUTRA module 114 can send one or more measurement results to the NR module 116 in response to detecting the SCG failure. The NR module 116 can include the one or more measurement results in the SCGFailureInformationEUTRA message. In one aspect, when the EUTRA module 114 sends the one or more measurement results to the NR module 116, the EUTRA mode 114 removes the one or more measurement results (i.e., the one or more measurement results is not valid to be reported). In another aspect, when NR module 116 includes the one or more measurement results in the SCGFailureInformationEUTRA message, the NR module 116 indicates the EUTRA mode 116 to remove the one or more measurement results (i.e., the one or more measurement results is not valid to be reported).

Figure 5:
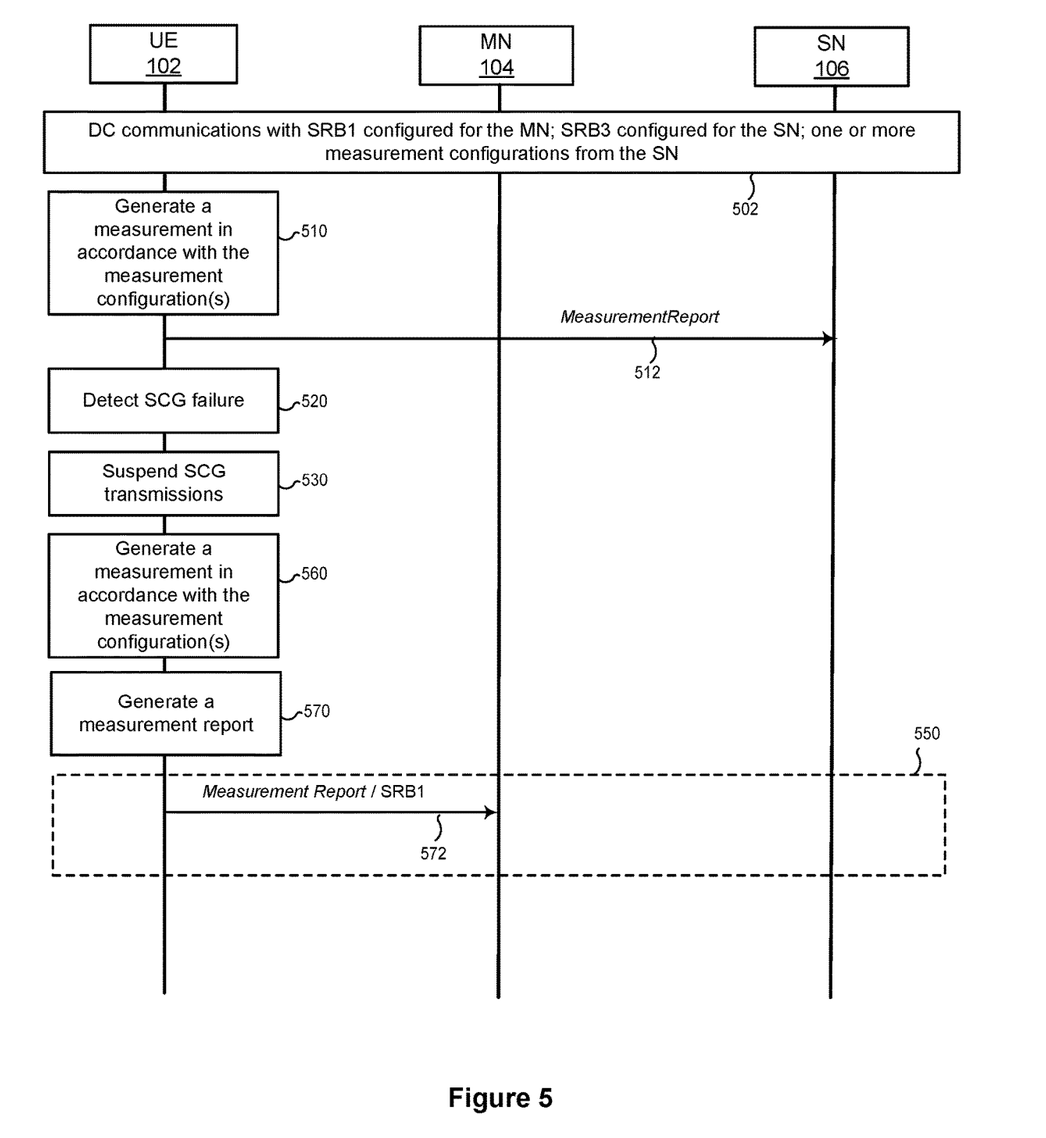
FIG. 5 illustrates an example scenario in which a UE transmits a measurement report to the MN on an SRB1.

In the scenario of FIG. 5, the UE 102 initially is communicating 502 in DC with the MN 104 and the SN 106. The scenario of FIG. 5 can pertain to at least the EN-DC, NGEN-DC, NR-NR DC (NN-DC), and the NE-DC modes of DC.

The UE 102 is configured with an SRB1 to exchange RRC messages with the MN 104. The UE 102 is also configured with at least one DRB that utilizes resources of the SCG 124 provided by the SN 106. Still further, the SN 106 configures the UE 102 with at least one measurement configuration. As one example, the SN 106 can provide the UE 102 one, some or all of the measurement configuration settings via the MN 104. In another example, the SN 106 can provide the UE 102 one, some or all of the measurement configuration settings over the SRB3.

The UE 102 triggers measurement reporting in accordance with one of the at least one measurement configuration and generates 510 a measurement report. More specifically, the configuration can specify that the UE 102 should generate a measurement report in response to a particular event or, in another scenario, periodically in accordance with a certain schedule.

The UE 102 then attempts 512 to transmit the measurement report (e.g., in the form of a MeasurementReport message) in response to the triggering. In particular, the UE 102 initiates transmission of the MeasurementReport message on the SRB3 to the SN 106.

The UE 102 then detects 520 an SCG failure and, in response, suspends 530 SCG transmissions (e.g., NR SCG transmission or EUTRA SCG transmission, depending on the DC mode). Subsequently, the UE 102 again triggers measurement reporting in accordance with the measurement configuration received from the SN 106 (events or procedure 502). The UE 102 generates 550 a measurement and transmits 572 a corresponding MeasurementReport message.

The UE 102 initiates transmission of the MeasurementReport message to the MN 104 when the SCG transmissions remain in the suspended state 550. In response to the initiation event, the UE 102 transmits the MeasurementReport message over the SRB1 to the MN 104.

When the scenario of FIG. 5 is implemented in the EN-DC mode or the NGEN-DC mode, the UE 102 in some cases transmits the MeasurementReport message over the SRB1 (i.e., an EUTRA SRB1) by including the MeasurementReport message in an UL Information Transfer for MR-DC (ULInformationTransferMRDC) message and transmitting the ULInformationTransferMRDC message on the SRB1 to the MN 104. Upon receiving the ULInformationTransferMRDC message, the MN 104 in some implementations extracts the MeasurementReport message out of the ULInformationTransferMRDC message and forwards the MeasurementReport message to the SN 106.

When the scenario of FIG. 5 is implemented in the NN-DC mode or the NE-DC mode, the UE 102 in some cases transmits the MeasurementReport message over the SRB1 (i.e., an NR SRB1) by including the MeasurementReport message in an UL Information Transfer for MR-DC (ULInformationTransferMRDC) message and transmitting the ULInformationTransferMRDC message on the SRB1 to the MN 104. Upon receiving the ULInformationTransferMRDC message, the MN 104 in some implementations extracts the MeasurementReport message out of the ULInformationTransferMRDC message and forwards the MeasurementReport message to the SN 106. Alternatively, the UE 102 can utilize a ULInformationTransferNRDC or ULInformationTransferNEDC messages.

In another implementations for the NN-DC or NE-DC modes of DC, the UE 102 transmits the MeasurementReport message on the SRB1 (i.e., a NR SRB1) by including the MeasurementReport in a UL Information Transfer (ULInformationTransfer) message and transmitting the ULInformationTransfer message on the SRB1 to the MN 104. Upon receiving the ULInformationTransfer message, the MN 104 can extract the MeasurementReport message from the ULInformationTransfer message and forward the MeasurementReport message to the SN.

In case of the EN-DC, NGEN-DC or NN-DC, the MeasurementReport messages are NR MeasurementReport messages. In case of the NE-DC, the MeasurementReport messages are EUTRA MeasurementReport messages.

Thus, the UE 102 in this scenario provides a measurement report to the MN 104 even though the SCG transmissions were suspended. For example, similar to the examples above, the MN 104 can attempt to recover from the SCG failure. When the UE 102 is operating in the EN-DC or NGEN-DC mode, the UE 102 can transmit a EUTRA RRC message (e.g., a EUTRA RRC Connection Reconfiguration message) on the SRB1 to recover from the SCG failure. The EUTRA RRC message may include a NR RRC message (e.g., a NR RRC Reconfiguration message). The NR RRC message can include a certain NR configuration. The UE 102 can resume the NR SCG transmission according to the NR RRC message with the SN 106 or another SN (not shown in FIG. 5). After the UE 102 resumes NR SCG transmissions, the UE 102 can transmit a MeasurementReport message on the SRB3. The UE 102 can transmit a EUTRA RRC response message (e.g., a EUTRA RRC Connection Reconfiguration Complete message) on the SRB1 to the MN 104 to respond to the EUTRA RRC message. The UE 102 can include a NR RRC response message (e.g., a NR RRC Reconfiguration Complete message) in the EUTRA RRC response message to respond to the NR RRC Reconfiguration message. The MN 104 may forward the NR RRC response message to the SN 106 or the other SN.

When the UE 102 is operating in the EN-DC or NGEN-DC mode, the MN 104 in an example scenario transmits, to the UE 102, a EUTRA RRC message (e.g., a EUTRA RRC Connection Reconfiguration message) on the SRB1, so as to configure the UE 102 to not operate in the DC mode after receiving an SCGFailureInformationNR message. The UE 102 can transmit an EUTRA RRC response message (e.g., a EUTRA RRC Connection Reconfiguration Complete message) on the SRB1 to the MN to respond to the EUTRA RRC message. The UE 102 then can release NR configurations (including the at least one measurement configuration) associated with the SN 106, in response to the EUTRA RRC message. The UE 102 may receive the NR configurations from the SN 106 via the MN 104 or via the SRB3, prior to the SCG failure.

Figure 6:
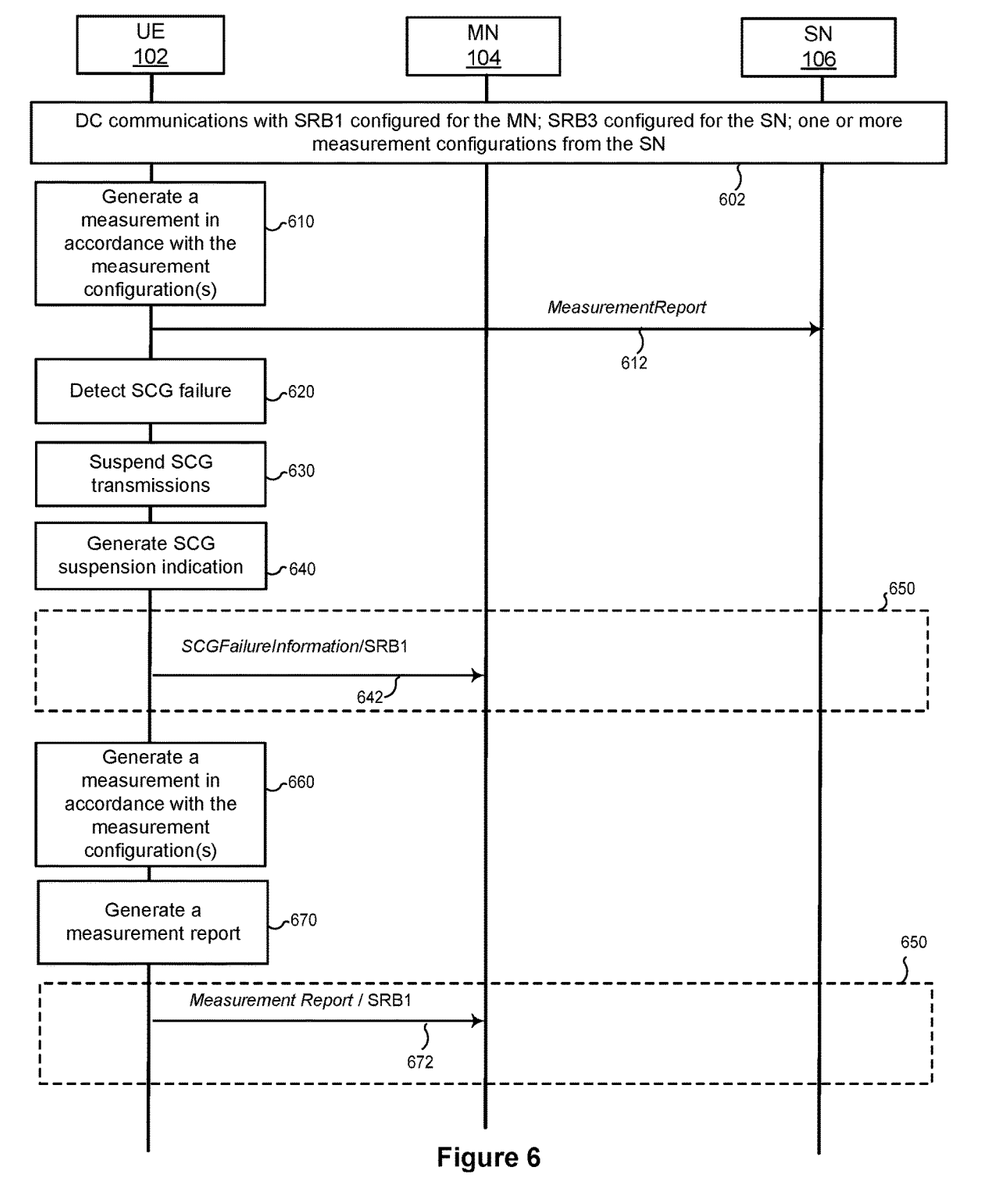
FIG. 6 illustrates an example scenario in which a UE transmits a measurement report on an SRB1 as well as an indication of SCG failure to the MN.
Figure 7:
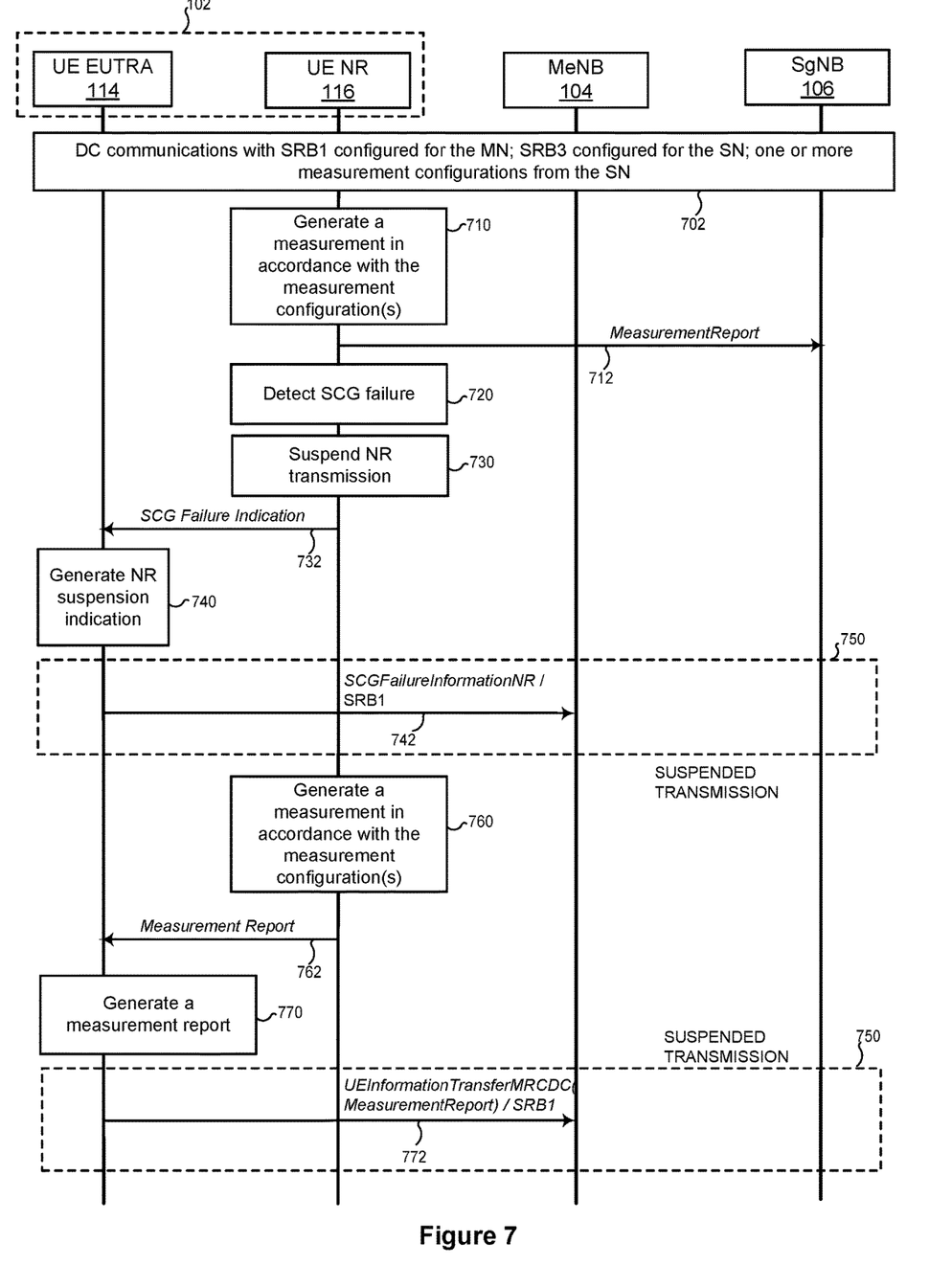
FIG. 7 illustrates an example scenario in which a EUTRA module operating in the UE transmits a measurement report to a MeNB as well as an indication of SCG failure to the MN.
Figure 8:
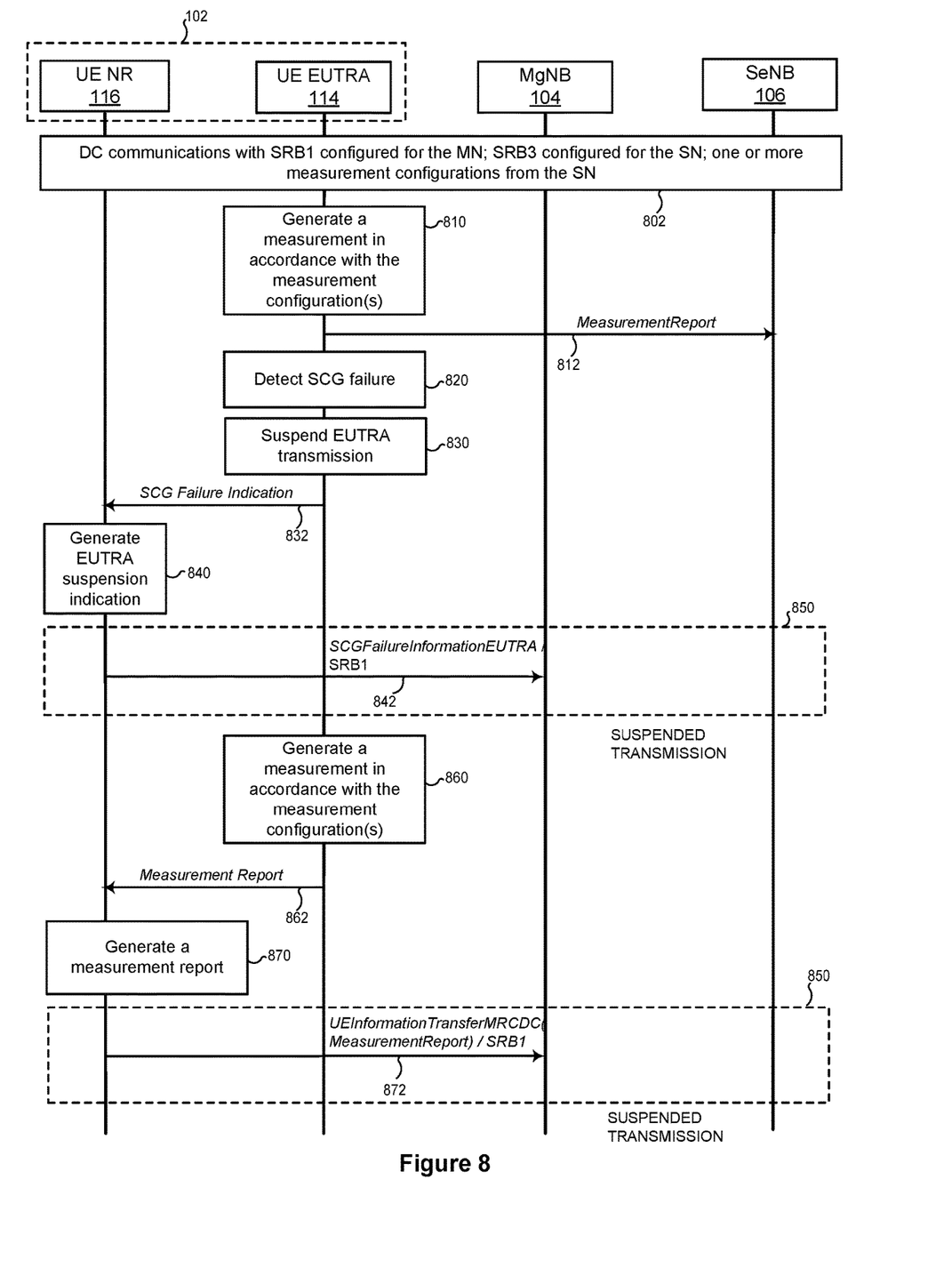
FIG. 8 illustrates an example scenario in which an NR module operating in the UE transmits a measurement report to a MgNB as well as an indication of SCG failure to the MN.

As illustrated in FIGS. 6-8, the UE 102 can implement both the techniques for transmitting an indication of SCG failure as well as a measurement report to the MN, when the SCG transmission is suspended.

Referring first to FIG. 6, the UE 102 at the beginning of the scenario is communicating 602 in DC with the MN 104 and the SN 106. The UE 102 is configured with an SRB1 and an SRB3 for communication with the MN 104 and the SN 106, respectively. The UE 102 also is configured with a measurement configuration by the SN 106. The UE 102 triggers measurement reporting in accordance with the measurement configuration and generates 610 a measurement report. The UE 102 transmits 612 the measurement report to the SN 106. After the UE 102 detects 620 SCG failure, the UE 102 suspends 630 NR or EUTRA SCG transmissions, depending on the configuration of DC mode, and generates 640 an appropriate SCG suspension indication.

The UE 102 transmits 642 the indication to the MN 104 when the SCG transmissions are in the suspended state 650. The SCGFailureInformation indication can be specific to the SCG such as SCGFailureInformationNR for EN-DC and NGEN-DC modes or SCGFailureInformationEUTRA for NE-DC mode. The UE 102 also generates 660 a measurement in accordance with the previously received measurement configuration and formats 670 a measurement report. The UE 102 then transmits 672 the measurement report to the MN 104 while the SCG transmissions remain in the suspended state 650. If desired, the order of the events 642 and 672 can be reversed.

In the scenario of FIG. 7, the EUTRA module 114 transmits both the SCGFailureInformationNR message and a measurement report to the MeNB 104. The events 702, 710, 712, 720, 730, 740, 742, 760, 770, and 772 are similar to the events 602, 610, 612, 620, 630, 640, 642, 660, 670, and 672 discussed with reference to FIG. 6, and the state 750 is similar to the state 650. However, the NR module 116 in this scenario indicates 732 the SCG failure to the EUTRA module 114 via an internal SCG failure indication message, for example, and the EUTRA module 114 reports the SCG failure to the MeNB 104. The NR module 116 also transmits 762 the measurement report to the EUTRA module 114 via an internal message, and the EUTRA module 114 again forwards 772 the measurement report to the MeNB 104.

On the other hand, in the scenario of FIG. 8, it is the NR module 116 rather than the EUTRA module 114 that provides both an SCG failure indication and a measurement report to the MN when SCG transmissions are suspended. More specifically, the NR module 116 transmits both the SCGFailureInformationEUTRA message and a measurement report to the MgNB 104. The events 802, 810, 812, 820, 830, 840, 842, 860, 870, and 872 are similar to the events 602, 610, 612, 620, 630, 640, 642, 660, 670, and 672 discussed with reference to FIG. 6, and the state 850 is similar to the state 650. However, the EUTRA module 114 in this scenario indicates 832 the SCG failure to the NR module 116 via an internal SCG failure indication message, for example, and the NR module 116 reports the SCG failure to the MgNB 104. The EUTRA module 114 also transmits 862 the measurement report to the NR module 116 via an internal message, and the NR module 116 again forwards 872 the measurement report to the MgNB 104.

Referring generally to the figures above, prior to transitioning to the EN-DC, NGEN-DC, or NN-DC mode, the UE 102 can connect to the MN 104 and obtain an SRB1 configuration for the MN 104 (which in various configurations can be an MeNB, a master ng-eNB or an MgNB). The UE 102 then can transmit a MeasurementReport message on the SRB1 to the MN 104. The MN 104 can determine that it should configure the UE 102 to connect to the SN 106 (e.g., an SgNB) in response to the MeasurementReport message. The MN 104 can make this determined based on the indication in the MeasurementReport message that the UE 102 receives a signal of sufficient strength, quality, etc. on a downlink carrier of the SN 106. The MN 104 then can initiate an SN Addition procedure by sending a SN Addition Request message to the SN 106.

Next, the SN 106 can generate a first RRC Reconfiguration message and include this message in an SN Addition Request Acknowledge message. The SN 106 can send the SN Addition Request Acknowledge message to the MN 104 in response to the SN Addition Request message. When the MN 104 is implemented as an MeNB or a master ng-eNB, the MN 104 can include the first RRC Reconfiguration message in an RRC Connection Reconfiguration message. The MN 104 can transmit the UE the RRC Connection Reconfiguration message in response to the SN Addition Request Acknowledge message and receives an RRC Connection Reconfiguration Complete message from the UE 102 in response to the RRC Connection Reconfiguration message. In some implementations, the UE 102 can include a first RRC Reconfiguration Complete message in the RRC Connection Reconfiguration Complete message to respond to the first RRC Reconfiguration message. The MN 104 can forward the first RRC Reconfiguration Complete message to the SN 106. The SRB1 can be a EUTRA SRB1. The MeasurementReport message, the RRC Connection Reconfiguration message, and the RRC Connection Reconfiguration Complete message can be in a EUTRA RRC message format.

When the MN 102 is an MgNB, the MN 104 includes the first RRC Reconfiguration message in a second RRC Reconfiguration message generated by the MN 104. The MN 104 transmits the second RRC Reconfiguration message to the UE 102 in response to the SN Addition Request Acknowledge message and receives a second RRC Reconfiguration Complete message from the UE 102 in response to the second RRC Reconfiguration message. In some implementations, the UE 102 may include a first RRC Reconfiguration Complete message in the second RRC Reconfiguration Complete message to respond to the first RRC Reconfiguration Complete message. The MN 104 can forward the first RRC Reconfiguration Complete message to the SN 106. In this case, the SRB1 can be an NR SRB1. The MeasurementReport message, the first RRC Reconfiguration message, the first RRC Reconfiguration Complete message, the second RRC Reconfiguration message, and the second RRC Reconfiguration Complete message can be in an NR RRC message format. In both cases discussed above, the UE 102 can perform a random access procedure with the SN 106 in response to/according to the first RRC Reconfiguration message.

In the example above, the first RRC Reconfiguration message can include a CellGroupConfig IE for an SCG the UE 102 can use to communicate with the SN 106. In another example, the SN 106 can include a Radio Bearer Configuration (RadioBearerConfig) which configures an SRB3 (i.e., a NR SRB3) or a DRB in the SN Addition Request Acknowledge message. The MN 104 can include the RadioBearerConfig in the RRC Connection Reconfiguration message or the second RRC Reconfiguration message. The SRB3 or the DRB can be an SCG bearer when the MN 104 does not configure MCG radio resources for the SRB3 or the DRB. The SRB3 or the DRB can be an SCG split bearer if the MN 104 configures MCG radio resources for the SRB3 or the DRB. As an additional example, the SN 106 does not include the RadioBearerConfig in the SN Addition Request Acknowledge message. The MN 104 does not include the RadioBearerConfig in the RRC Connection Reconfiguration message. The MN 104 can generate and include another RadioBearerConfig in the RRC Connection Reconfiguration message or the second RRC Reconfiguration message.

Further, the first RRC Reconfiguration message can include one, some or all of the measurement configuration settings discussed above. In another example, the SN 106 can transmit, to the UE 102 on the SRB3, a third RRC Reconfiguration message configuring one, some or all of the at least one measurement configuration settings discussed above.

Referring generally to the figures above, prior to transitioning to the NE-DC mode, the UE 102 can connect to the MN 104 and obtain an SRB1 configuration for the MN 104 (which in various configurations can be an MgNB). The UE 102 then can transmit a MeasurementReport message on the SRB1 to the MN 104. The MN 104 can determine that it should configure the UE 102 to connect to the SN 106 (e.g., an SgNB) in response to the MeasurementReport message. The MN 104 can make this determined based on the indication in the MeasurementReport message that the UE 102 receives a signal of sufficient strength, quality, etc. on a downlink carrier of the SN 106. The MN 104 then can initiate an SN Addition procedure by sending a SN Addition Request message to the SN 106.

Next, the SN 106 can generate an RRC Connection Reconfiguration message and include this message in an SN Addition Request Acknowledge message. The SN 106 can send the SN Addition Request Acknowledge message to the MN 104 in response to the SN Addition Request message. The MN 104 can include the RRC Connection Reconfiguration message in an RRC Reconfiguration message. The MN 104 can transmit the UE the RRC Reconfiguration message in response to the SN Addition Request Acknowledge message and receives an RRC Reconfiguration Complete message from the UE 102 in response to the RRC Reconfiguration message. In some implementations, the UE 102 can include a RRC Connection Reconfiguration Complete message in the RRC Reconfiguration Complete message to respond to the RRC Connection Reconfiguration message. The MN 104 can forward the RRC Connection Reconfiguration Complete message to the SN 106. The SRB1 can be a NR SRB1. The MeasurementReport message, the RRC Reconfiguration message, and the RRC Reconfiguration Complete message can be in a NR RRC message format. The RRC Connection Reconfiguration message and the RRC Connection Reconfiguration Complete message can be in a EUTRA RRC message format.

In the example above, the RRC Connection Reconfiguration message can include a RadioResourceConfigDedicated IE for an SCG the UE 102 can use to communicate with the SN 106. In another example, the SN 106 can include a Radio Bearer Configuration (RadioBearerConfig) which configures an SRB3 (i.e., a NR SRB3) or a DRB in the SN Addition Request Acknowledge message. The MN 104 can include the RadioBearerConfig in the RRC Reconfiguration message. The SRB3 or the DRB can be an SCG bearer when the MN 104 does not configure MCG radio resources for the SRB3 or the DRB. The SRB3 or the DRB can be an SCG split bearer if the MN 104 configures MCG radio resources for the SRB3 or the DRB. As an additional example, the SN 106 does not include the RadioBearerConfig in the SN Addition Request Acknowledge message. The MN 104 does not include the RadioBearerConfig in the RRC Reconfiguration message. The MN 104 can generate and include another RadioBearerConfig in the RRC Reconfiguration message.

Further, the RRC Connection Reconfiguration message can include one, some or all of the measurement configuration settings discussed above. In another example, the SN 106 can transmit, to the UE 102 on the SRB3, another RRC Connection Reconfiguration message configuring one, some or all of the at least one measurement configuration settings discussed above.

Figure 9:
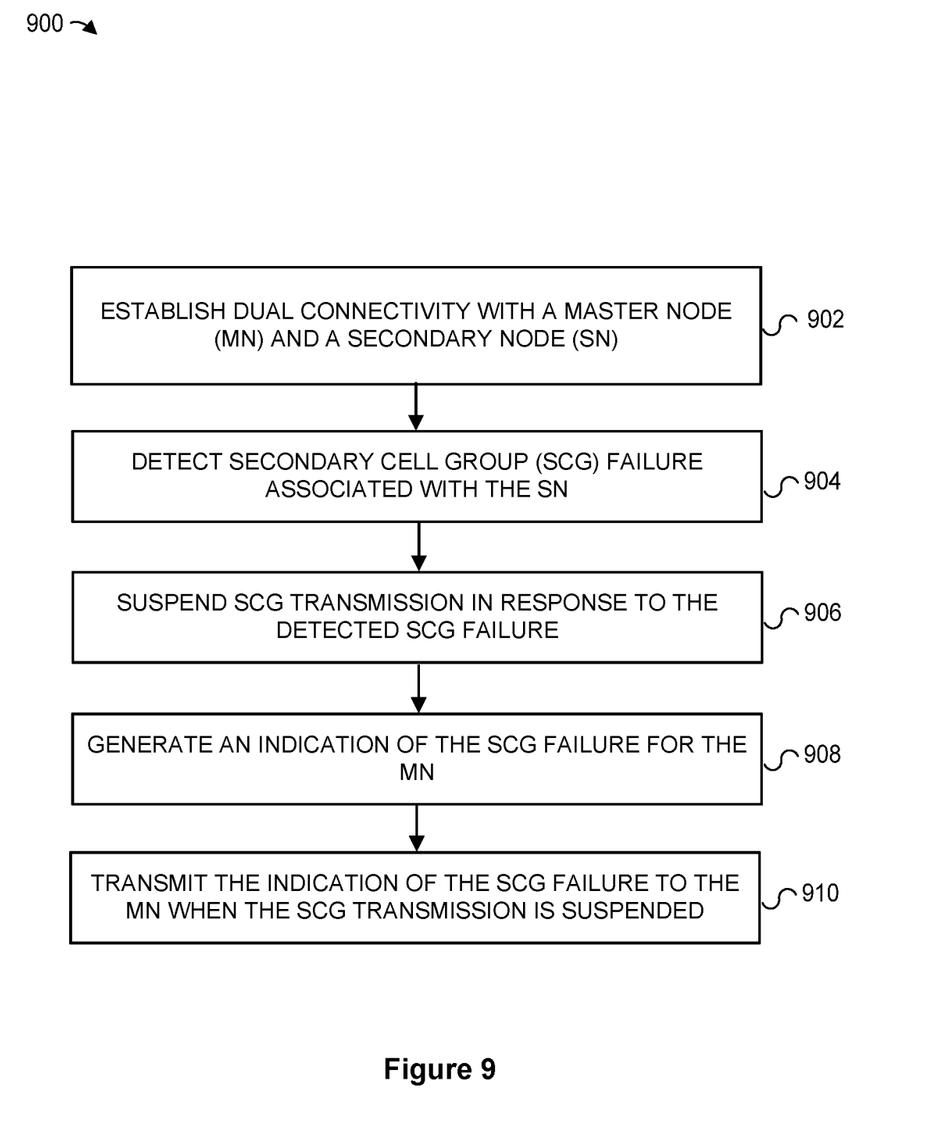
FIG. 9 is a flow diagram of an example method for reporting SCG failure in dual connectivity, which can be implemented in the UE of FIG. 1.

Now referring to FIG. 9, an example method 900 for reporting SCG failure in dual connectivity can be implemented in the UE 102 of FIG. 1, for example. The method 1000 can be implemented using hardware, software, firmware, or any suitable combination of hardware, software, and firmware.

The method 900 begins at block 902, where the UE 102 establishes dual connectivity with an MN and a SN (events 202, 302, 402, 502, 602, 702, and 802 of FIGS. 2-8). Next, at block 904, the UE detects SCG failure (events 220, 320, 420, 520, 620, 720, and 820 of FIGS. 2-8). In response, the UE 102 at block 906 suspends SCG transmissions (events 230, 330, 430, 530, 630, 730, and 830 of FIGS. 2-8). At block 908, the UE 102 then generates an indication of SCG failure for the MN (events 240, 340, and 440 of FIGS. 2-4; events 640, 740, and 840 of FIGS. 6-8). At block 910, the UE 102 transmits the indication of SCG failure to the MN (event 242, 342, and 442 of FIGS. 2-4; events 642, 742, and 842 of FIGS. 6-8) while the SCG transmissions remain suspended (state 250, 350, 450, 550, 650, 750, and 850 of FIGS. 2-8).

Figure 10:
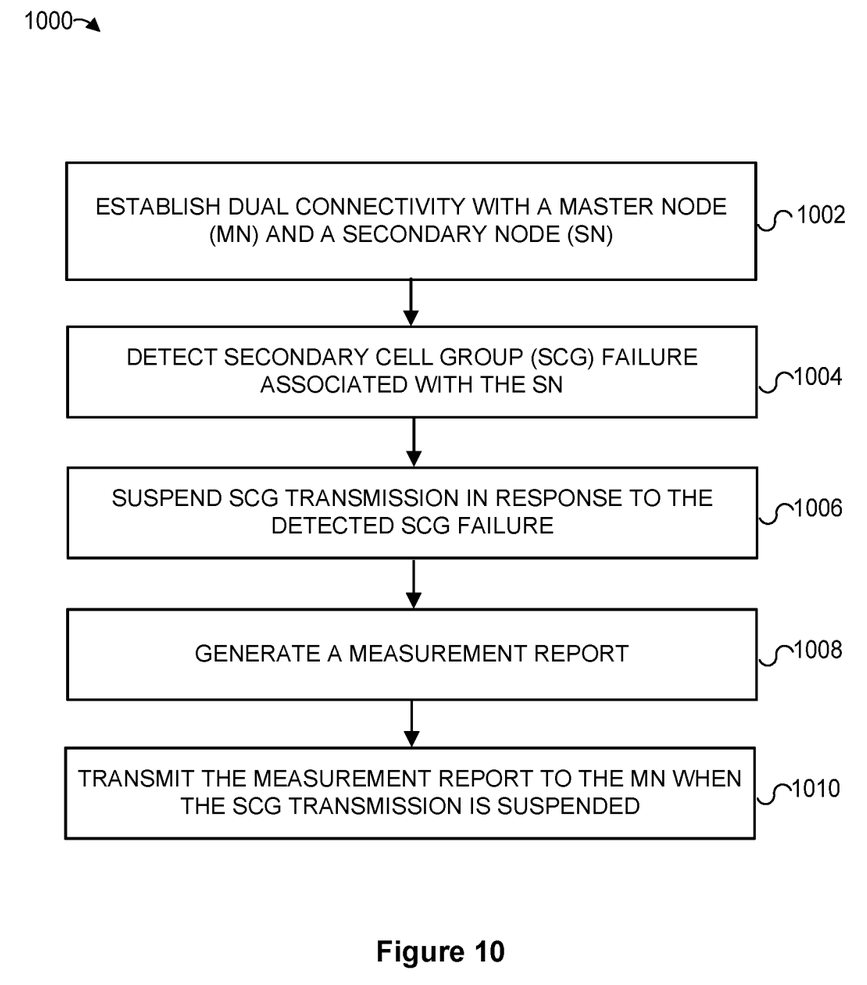
FIG. 10 is a flow diagram of an example method for providing measurement reports in dual connectivity, which can be implemented in the UE of FIG. 1.

FIG. 10 is a flow diagram of example method 1000 for providing measurement reports in dual connectivity, which can be implemented in the UE 102 of FIG. 1. Similar to the method 900 discussed above, the method 1000 can be implemented using hardware, software, firmware, or any suitable combination of hardware, software, and firmware.

The method 1000 begins at block 1002, where the UE 102 establishes dual connectivity with an MN and a SN (events 202, 302, 402, 502, 602, 702, and 802 of FIGS. 2-8). Next, at block 1004, the UE detects SCG failure (events 220, 320, 420, 520, 620, 720, and 820 of FIGS. 2-8). In response, the UE 102 at block 1006 suspends SCG transmissions (events 230, 330, 430, 530, 630, 730, and 830 of FIGS. 2-8). The UE 102 at block 1008 generates a measurement report for the MN (events 570, 670, 770, and 870 of FIGS. 5-8). At block 1010, the UE 102 transmits the measurement report to the MN (events 572, 672, 772, and 872 of FIGS. 5-8) while the SCG transmissions remain suspended (state 250, 350, 450, 550, 650, 750, and 850 of FIGS. 2-8).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling SCG failures in DC through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method in a user device operating in dual-mode (DC) connectivity with a master node (MN) and a secondary node (SN), the method comprising:
   detecting a failure of a secondary cell group (SCG) associated with the SN;
   suspending an SCG transmission in response to detecting the failure of the SCG;
   generating a message related to a status of the SCG for transmission to the MN, the message including a first SCG failure type and a second SCG failure type; and
   transmitting the message to the MN when the SCG transmission is suspended.

2. The method of claim 1, further comprising:
   communicating with the MN using a first RAT, and
   communicating with the SN using a second RAT different from the first RAT.

3. The method of claim 1, wherein generating the message includes generating an indication of the SCG failure.

4. The method of claim 3, wherein:
   the user device communicates with the SN and the MN using a first radio access technology (RAT) and a second RAT, respectively; and
   the indication of the SCG failure is related to the first RAT.

5. The method of claim 3, wherein generating the indication of the SCG failure includes generating a message in a radio resource control (RRC) format of the first RAT.

6. The method of claim 3, further comprising:
   subsequently to suspending the SCG transmission, receiving, from the MN, a command to recover the SCG transmission; and
   recovering the SCG transmission in response to the command.

7. The method of claim 3, further comprising:
   generating a measurement report; and
   transmitting the measurement report to the MN 104 when the SCG transmission is suspended.

8. The method of claim 1, wherein generating the message includes generating a measurement report.

9. The method of claim 8, wherein generating the measurement report is in response to receiving a command to generate the measurement report from the SN.

10. The method of claim 8, wherein generating the measurement report is in response to detecting expiration of a periodic timer.

11. The method of claim 1, wherein transmitting the message to the MN includes transmitting the message using an uplink (UL) Information Transfer message.

12. The method of claim 1, wherein:
detecting the failure of the SCG includes detecting the failure at a first RRC module configured to communicate with the SN using a first RAT,
suspending the SCG transmission includes suspending the SCG transmission at the first RRC module, and
transmitting the message to the MN includes using a second RRC module configured to communicate with the MN using a second RAT;
the method further comprising:
transmitting an internal message indicating the SCG is suspended from the first RRC module to the second RRC module.

13. The method of claim 1, wherein detecting the failure of the SCG includes transmitting a measurement report to the SN over a signaling radio bearer (SRB) of type 3 (SRB3).

14. The method of claim 1, wherein suspending the SCG transmission includes suspending every signaling radio bearer (SRB) and data radio bearer (DRB) configured to utilize SCG resources provided by the SN.

15. The method of claim 1, wherein:
the first SCG failure type indicates one of (i) radio link failure (RLF), (ii) a failure of SCG configuration, (iii) a failure of SCG reconfiguration, or (iv) failure of an SCG integrity check; and
the second SCG failure type indicates that a maximum uplink transmission timing difference was exceeded.

16. A user device comprising:
processing hardware;
a non-transitory computer-readable medium storing instructions that, when executed by the processing hardware, cause the user device to:
detect a failure of a secondary cell group (SCG) associated with an SN,
suspend an SCG transmission in response to detecting the failure of the SCG,
generate a message related to a status of the SCG for transmission to an MN, the message including a first SCG failure type and a second SCG failure type, and
transmit the message to the MN when the SCG transmission is suspended.

17. The user device of claim 16, wherein:
to generate the message, the instructions cause the user device to generate an indication of the SCG failure.

18. The user device of claim 16, wherein:
the message is one of a measurement report or a UL Information Transfer message.

19. The user device of claim 16, wherein:
the first SCG failure type indicates one of (i) radio link failure (RLF), (ii) a failure of SCG configuration, (iii) a failure of SCG reconfiguration, or (iv) failure of an SCG integrity check; and
the second SCG failure type indicates that a maximum uplink transmission timing difference was exceeded.

\* \* \* \* \*